United States Patent
Pollock

(10) Patent No.: US 11,613,691 B1
(45) Date of Patent: Mar. 28, 2023

(54) WELL PROPPANTS

(71) Applicant: Oceanit Laboratories, Inc., Honolulu, HI (US)

(72) Inventor: Jacob Pollock, Honolulu, HI (US)

(73) Assignee: OCEANIT LABORATORIES, INC., Honolulu, HI (US)

( * ) Notice: Subject to any disclaimer, the term of this patent is extended or adjusted under 35 U.S.C. 154(b) by 398 days.

(21) Appl. No.: 16/731,732

(22) Filed: Dec. 31, 2019

Related U.S. Application Data

(60) Provisional application No. 62/786,925, filed on Dec. 31, 2018.

(51) Int. Cl.
| | |
|---|---|
| *C09K 8/80* | (2006.01) |
| *E21B 43/267* | (2006.01) |
| *G01V 1/46* | (2006.01) |
| *E21B 47/095* | (2012.01) |

(52) U.S. Cl.
CPC ............ *C09K 8/805* (2013.01); *E21B 43/267* (2013.01); *E21B 47/095* (2020.05); *G01V 1/46* (2013.01); *G01V 2210/123* (2013.01); *G01V 2210/14* (2013.01)

(58) Field of Classification Search
CPC ...... E21B 47/095; E21B 43/26; E21B 43/267; C09K 8/805; G01V 1/46; G01V 2210/14
See application file for complete search history.

(56) References Cited

U.S. PATENT DOCUMENTS

| | | | | |
|---|---|---|---|---|
| 6,059,034 A | * | 5/2000 | Rickards | C09K 8/80 166/310 |
| 6,330,916 B1 | * | 12/2001 | Rickards | C09K 8/80 507/924 |
| 9,500,069 B2 | * | 11/2016 | Ersoz | E21B 47/00 |
| 10,254,424 B1 | * | 4/2019 | Pollock | E21B 43/267 |
| 10,259,991 B2 | * | 4/2019 | Chopade | C09K 8/665 |
| 10,400,584 B2 | * | 9/2019 | Palomarez | E21B 21/062 |
| 11,105,091 B1 | * | 8/2021 | Pollock | B32B 27/065 |
| 11,199,068 B2 | * | 12/2021 | Inyang | E21B 33/13 |
| 2002/0114928 A1 | * | 8/2002 | Sheng | G10K 11/165 428/293.1 |
| 2002/0183930 A1 | * | 12/2002 | Plona | G01V 1/48 702/6 |
| 2004/0226715 A1 | * | 11/2004 | Willberg | E21B 47/00 166/308.1 |

(Continued)

FOREIGN PATENT DOCUMENTS

| | | | | | |
|---|---|---|---|---|---|
| CN | 111100612 A | * | 5/2020 | ........... | C09K 11/025 |
| RU | 2572871 C2 | * | 1/2016 | ............ | G01V 5/101 |
| WO | WO-9927229 A1 | * | 6/1999 | ............... | C09K 8/62 |

*Primary Examiner* — Jennifer H Gay
(74) *Attorney, Agent, or Firm* — Cermak Nakajima & McGowan LLP; James Creighton Wray

(57) ABSTRACT

Deployable smart acoustic resonance particles have dense cores, compliant matrixes surrounding the cores and stiff outer shells surrounding the matrixes. The particles have mechanical stress sensitivities that provide unique band gap shifts when compressed. Groups of similar particles with similar stress sensitivities and similar band gap shifts are added at different times to hydraulic fluids, as circulated through wells with the fluid and pushed into fractures. A plural, sonic monopole well logging tool is lowered into the well to determine locations and depth of fractures and local pressures by distinct resonance of individual groups.

4 Claims, 24 Drawing Sheets

(56) References Cited

U.S. PATENT DOCUMENTS

| | | | | |
|---|---|---|---|---|
| 2008/0191822 | A1* | 8/2008 | Knobloch | G01V 1/005 |
| | | | | 335/215 |
| 2009/0288820 | A1* | 11/2009 | Barron | C09K 8/805 |
| | | | | 166/250.1 |
| 2013/0062057 | A1* | 3/2013 | Smith, Jr. | E21B 47/00 |
| | | | | 166/254.2 |
| 2013/0068469 | A1* | 3/2013 | Lin | C09K 8/80 |
| | | | | 507/201 |
| 2014/0338905 | A1* | 11/2014 | Ersoz | E21B 43/26 |
| | | | | 166/280.1 |
| 2014/0371353 | A1* | 12/2014 | Mitchell | C04B 14/322 |
| | | | | 524/439 |
| 2015/0354337 | A1* | 12/2015 | Ersoz | G01V 1/06 |
| | | | | 166/250.1 |
| 2016/0024909 | A1* | 1/2016 | Han | E21B 47/11 |
| | | | | 166/250.1 |
| 2016/0047232 | A1* | 2/2016 | Palomarez | E21B 47/107 |
| | | | | 166/250.12 |
| 2017/0121591 | A1* | 5/2017 | Dahi Taleghani | C09K 8/805 |
| 2017/0260843 | A1* | 9/2017 | Ersoz | G01V 1/06 |
| 2018/0037803 | A1* | 2/2018 | Dahi Taleghani | E21B 43/267 |
| 2018/0086972 | A1* | 3/2018 | Chopade | C09K 8/665 |
| 2018/0258757 | A1* | 9/2018 | Werry | E21B 47/095 |
| 2019/0062623 | A1* | 2/2019 | Risser | G01V 1/02 |
| 2021/0040813 | A1* | 2/2021 | Inyang | E21B 33/13 |
| 2021/0148209 | A1* | 5/2021 | Stark | C09K 8/805 |
| 2022/0017813 | A1* | 1/2022 | Malik | C09K 8/64 |

* cited by examiner

Cross-well Sonic Logging

Seismic Imaging

Borehole Acoustic Reflection Survey

WELL PROPPANTS

This application claims the benefit of U.S. Provisional Application No. 62/786,925 filed Dec. 31, 2018, which is hereby incorporated by reference in its entirety as if fully set forth herein.

This invention may have been partially supported under U.S. Department of Energy Contract No. DE-SC0017738. The Government has certain rights in this invention.

BACKGROUND OF THE INVENTION

Hydraulic fracturing is utilized to stimulate hydrocarbon flow in order to extract oil and gas from geologic formations that do not have a centrally located reservoir. Pressurized fluids are employed to propagate fractures into deep rock layers so that entrapped oil and gas can be accessed. Pumping continues until the elevated pressure results in extension and creation of open paths via cracks and fissures, allowing the targeted product to be carried to the well bore at a much higher rate. These newly formed openings collapse upon removal of the high pressure. Therefore, a propping agent or "proppant" is injected along with the hydraulic fluid to create a support to maintain the opening. Proppant is delivered as a slurry suspension to the fissures as they are formed where it packs into and holds them open. The result of the process is highly dependent on the local properties of the formation as well as the process parameters and can be difficult to accurately predict or characterize. But understanding the resultant state of the well is critical to both predicting environmental risks and improving productivity.

Economic costs of ineffective hydraulic fracture jobs, lost injected materials, workover jobs, and well downtimes burden the natural gas economy. Poor zonal isolation and production control in hydraulic fracturing threaten environmental and public health.

Needs exist for new proppants and methods for improving.

SUMMARY OF THE INVENTION

A new acoustically responsive proppant has been successfully demonstrated to provide spatial mapping data regarding proppant location, concentration, and mechanical load.

This new acoustically responsive proppant provides the industry with its first practical, deployable smart proppant technology that can be interrogated using existing acoustic logging and remote monitoring tools.

Accurate characterization of the orientation and dimensions of hydraulic fractures includes measurements of proppant bed height, fracture coverage and flow directions, as well as perforation efficiency and details of wellbore connectivity. However, current proppants and available tools do not consistently provide a fully detailed and accurate description of the created fracture's character.

Maximum return on investment for a hydraulic fracturing operation depends on long-term productivity for the life of the well. Pumping rig operational expenses must be justified by continued output of the well. This output can be maximized through proper well management decisions that guide well work-over techniques, such as drilling, fracturing, and proppant injection. Fracture characterization and prediction can help to direct such decisions. Near-wellbore imaging of proppant distribution and environmental conditions with high resolution and sensitivity can provide this valuable information.

A novel proppant detection technology has been created based on acoustic metamaterials which allows detection of proppant location and environmental conditions away from the wellbore using industry standard acoustic logging tools. The smart proppant is engineered with specific acoustic band gap properties based on the geometry and mechanical properties of the proppant particles. The background well and formation properties can be measured at a frequency at which the smart proppant is acoustically transparent while the smart proppant location can be detected at an adjacent frequency at which it is acoustically opaque. Different smart proppants can be produced with unique acoustic band gap features in order to distinguish between different proppant injection stages.

This propped fracture diagnostics system utilizes acoustic methods to determine the location and mechanical environment of metamaterial particles. Acoustic metamaterials have the ability to influence sound waves much larger than their feature size, allowing small particles to be interrogated at sonic frequencies. Furthermore, these materials can be engineered to act as acoustic band gap filters, allowing sound transmission at most frequencies but reflecting sound at a particular range of frequencies. This provides for acoustic imaging of the surrounding formation and fracture features at certain frequencies and localization of proppant concentrations at another, giving a measure of how effectively hydraulic fractures near the wellbore have been filled with proppant.

Acoustic interrogation methods using the smart proppant have specific advantages over other well logging methods proposed for use with smart proppants. Proppants incorporating high thermal neutron capture cross section compounds can be detected with neutron logging tools, but these have a penetration depth limited to less than a foot. Magnetic nanoparticles have been proposed to locate proppant in hydraulic fractures using magnetic susceptibility measurements, but the range for these tools is limited to less than an inch and they can only be used in open boreholes or with PVC casing. Therefore, proppant concentration can be determined along the length of the wellbore, but only adjacent proppant will be detected. The acoustic proppant can be detected from at least tens of feet away from the wellbore, allowing true near-wellbore mapping of proppant location. Furthermore, with the acoustic smart proppant, no pretreatment log is required to differentiate between formation effects and smart proppant effects. Acoustic interrogation methods that can be used with this smart proppant include cross-well tomography, full waveform imaging, and flexural wave propagation measurements.

Loss of proppant from a fracture is a leading cause of production decline. But because the acoustically responsive proppant can be detected in flow, its concentration can be determined in fluids returning from the well, providing a means for continuously monitoring proppant flowback. Also, this smart proppant can be tuned to a particular frequency, allowing use as a treatment specific tracer and contrast agent. Unlike radioactive tracers which have limited isotope half-life and present environmental concerns and restrictions, this smart proppant can be used to safely monitor flowback throughout the life of the well.

Increased information about hydraulic fracturing operations directly benefits environmental health and safety. It can lead to increased stimulation efficiency, zonal isolation, and production control. Knowledge of proppant distribution and flowback helps to better understand the geomechanical forces and operational requirements of hydraulic fracturing. The ultimate result of this enhanced awareness is safer and more economical production techniques and processes that contribute to US energy independence.

The developed acoustic proppant technology can be used to map proppant location, concentration, and mechanical load using an industry standard monopole logging tool. It is also amenable to other acoustic interrogation technologies including borehole acoustic reflection survey, cross-well sonic logging, and seismic imaging, including vertical seismic profiling. The smart proppant has potential for use in other oil and gas areas that would benefit from stress monitoring, such as gravel packed screens. The potential for distinct acoustic signatures from different proppant structures provides the opportunity for mapping of multiple proppant injections as well as acoustic monitoring for proppant flow back tracking. Furthermore, the engineered particles developed have potential for acoustically responsive composite materials as well as sound dampening materials.

Innovation

The novelty in the new proppant and method includes providing acoustic metamaterial particles having elastic foam layers with strain stiffening properties that impart mechanical stress sensitivity, creating custom acoustic metamaterial particles to either distinguish different injection stages or match a specific acoustic interrogation tool's frequency range, measuring mechanical stress using acoustic metamaterial particles by looking at the band gap shift, creating a log of an oil and gas well that maps proppant concentration and mechanical stress, creating particles using an additive process of either pan coating or fluidized bed coating, and producing acoustic metamaterial particles at a small size scale (100's of microns to millimeters).

The invention provides new deployable acoustic proppants for use in acoustic well logging and remote monitoring. Each of the acoustic proppants has a high density core, a compliant matrix surrounding the core, and a stiff outer shell surrounding the compliant matrix.

The acoustic proppants are particles. The compliant matrix surrounding the core and the stiff outer shell have strain stiffening properties which impart mechanical stress sensitivities that provide unique acoustic band gap shift.

The acoustic proppants have sizes of from about 12/18 to about 40/100 mesh.

The new acoustic proppants are combined with other proppants. The new acoustic proppants are combined with sand or ceramic proppant in a 2%-20% by weight ratio compared with the total weight of proppant. The sand is 20/40 mesh sand. The acoustic proppants have sizes in a range of 12/18 mesh or in a range of 12/20 mesh, or in a range of 12/40 mesh.

The acoustic proppants produce shifts in acoustic band gap frequency resonance dependent on mechanical loads. Different groups of the acoustic proppants are produced from selected acoustic metamaterials having different resonances and different transmission losses at different applied frequencies.

Plural distinct groups of deployable acoustic proppants have high density cores, compliant matrixes surrounding the cores and stiff outer shells. The proppants having distinct acoustic band gap resonances and having distinct band gap shifts upon compression loading stresses.

A sonic monopole logging tool has one or more sonic sources and plural distinct sonic receivers. The tool is supported on a wireline for lowering in a well, and is adapted for locating concentrations of the plural distinct acoustic proppants and receiving acoustic resonance from the acoustic proppants.

The sonic receivers are adapted for receiving distinct band shifted resonance from the groups of acoustic proppants varying according to load stresses on the acoustic proppants.

The invention provides plural band gap shifting acoustic resonance proppants having dense cores, compliant matrixes surrounding the dense cores and stiff outer shells surrounding the compliant matrixes, The acoustic resonance proppants having similar structures and similar resonances are added to well fracturing hydraulic fluids and circulate through the well with the hydraulic fluids with the introduced different groups of the acoustic resonance proppants, migrating and depositing acoustic resonance proppants in fractures extending from the well. Acoustic proppants returning well are sensed by resonance of the acoustic proppants.

The invention provides plural different groups of distinct band gap shifting acoustic resonance proppants having dense cores, compliant matrixes surrounding the dense cores and stiff outer shells surrounding the compliant matrixes. Sequentially introducing to the well fracturing hydraulic fluids, separates the different groups of the acoustic resonance proppants having similar structures and similar resonances.

The hydraulic fluids circulate through the well with the sequentially introduced different groups of the acoustic resonance proppants.

The different groups of the acoustic resonance proppants migrate and deposit in fractures extending from the well. Sensing return from the well of the acoustic proppants and distinguishes the different groups by distinct resonance of the acoustic proppants.

These and further and other objects and features of the invention are apparent in the disclosure, which includes the above and ongoing written specification, with the claims and the drawings.

BRIEF DESCRIPTION OF THE DRAWINGS

FIGS. 2 and 3 are log examples shown in the frequency domain with extracted proppant concentration and closure stress logs along a close-up depth of the wellbore.

FIGS. 9-12 show part of the small scale pan coating fabrication system for acoustic particle production.

DETAILED DESCRIPTION

Figure 1:
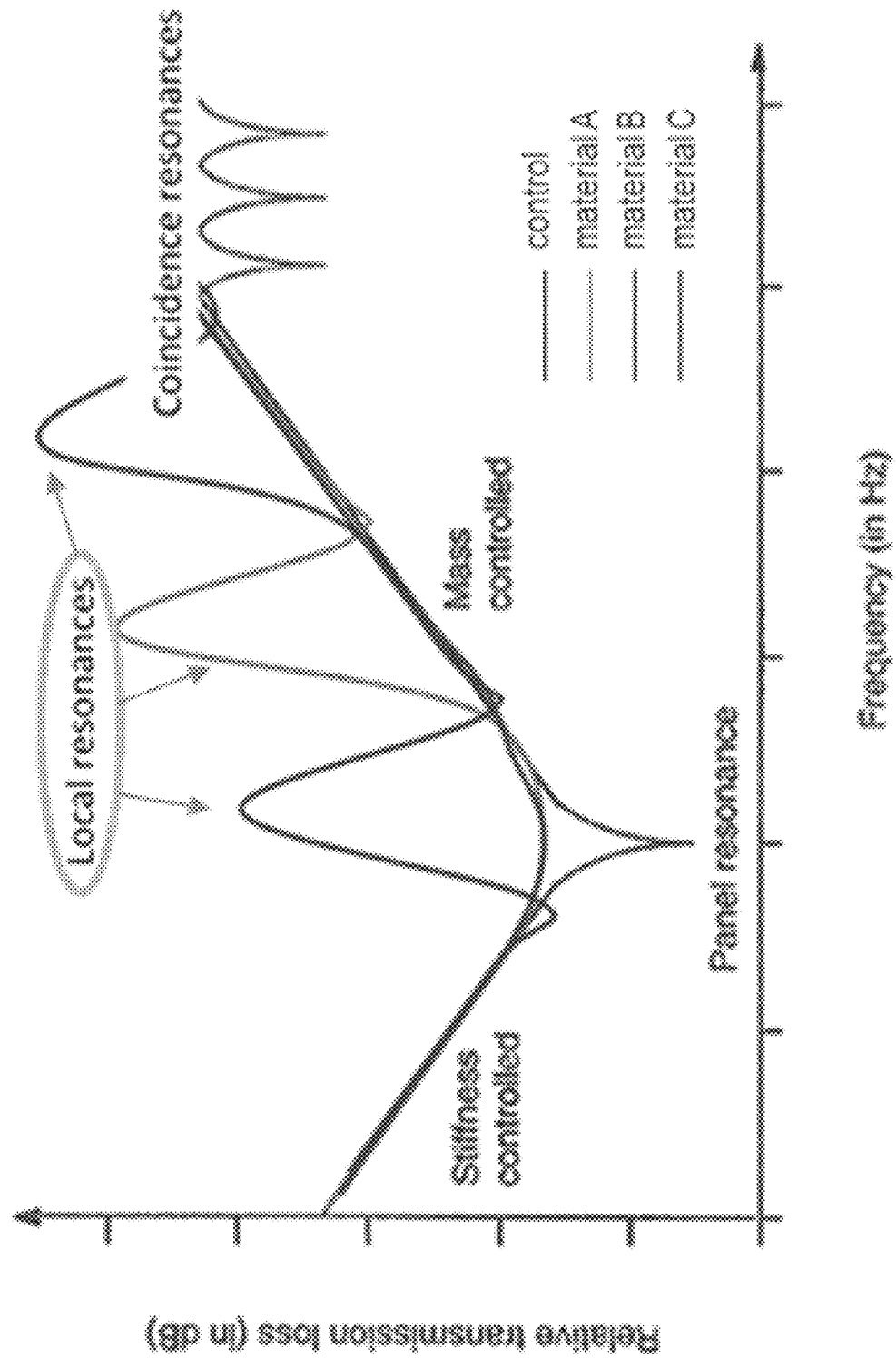
FIG. 1 is a diagram of acoustic metamaterial band gap behavior. Transmission loss greatly increases at specific frequency ranges depending on the material.

FIG. 1 is a diagram of acoustic metamaterial band gap behavior. Transmission loss greatly increases at specific frequency ranges depending on the material. Differing materials A, B and C have different resonances and produce greater transmission loss at higher frequencies.

Figures 2, 3, 4, 5:
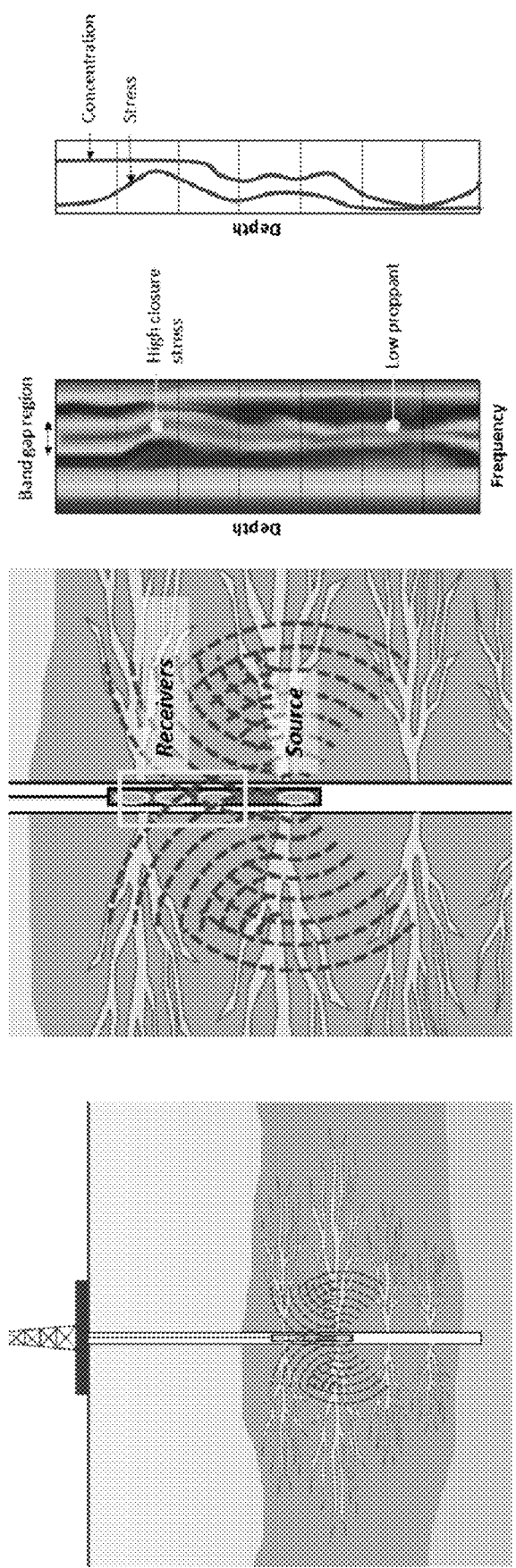
FIGS. 2 and 3 are schematic representations of acoustic proppant detection in a vertical, hydraulically fractured well using a triple sonic monopole logging tool on a wireline.
FIGS. 4 and 5 show expected log examples in the frequency domain and with extracted proponent concentration and closure stress logo along a close-up depth of the wellbore.

FIGS. 2 and 3 are schematic representations of acoustic proppant detection in a vertical, hydraulically fractured well using a triple sonic monopole logging tool on a wireline. FIGS. 2 and 3 are log examples shown in the frequency domain with extracted proppant concentration and closure stress logs along a close-up depth of the wellbore. FIG. 3 shows an enlarged probe 10 with a transmission source 12 and a number of receivers 14. The probe depth is recorded. Received frequencies shown in FIG. 4 in the band gap region 16 reveal high closure stress 18 and low proppant 20, which are logged as low proppant 22 concentration 24 and high closure stress 26 on log 28.

FIG. 5 shows a log example of low proponent concentration 22 in a proponent concentration log 24 and closure stress 26 along a close-up of depth of the wellbore 28.

Figure 8:
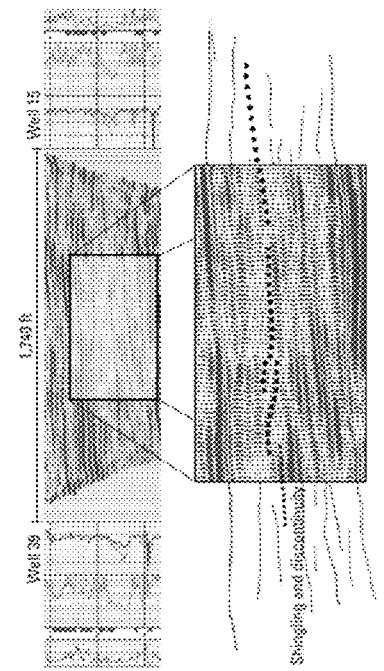
FIGS. 6-8 show additional acoustic interrogation techniques for determining smart proppant location with varying depth of investigation and imaging resolution.
Figure 7:
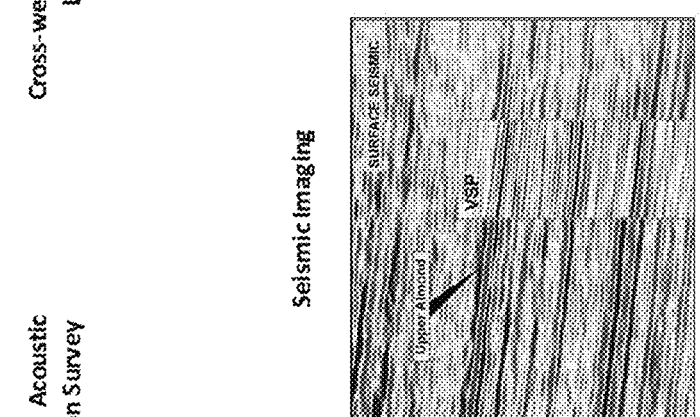
Figure 6:
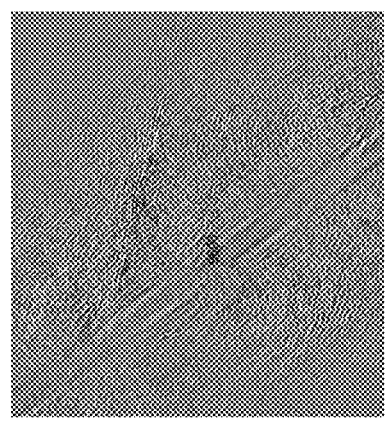

FIGS. 6-8 show additional acoustic interrogation techniques for determining smart proppant location with varying depth of investigation and imaging resolution.

Figure 9:
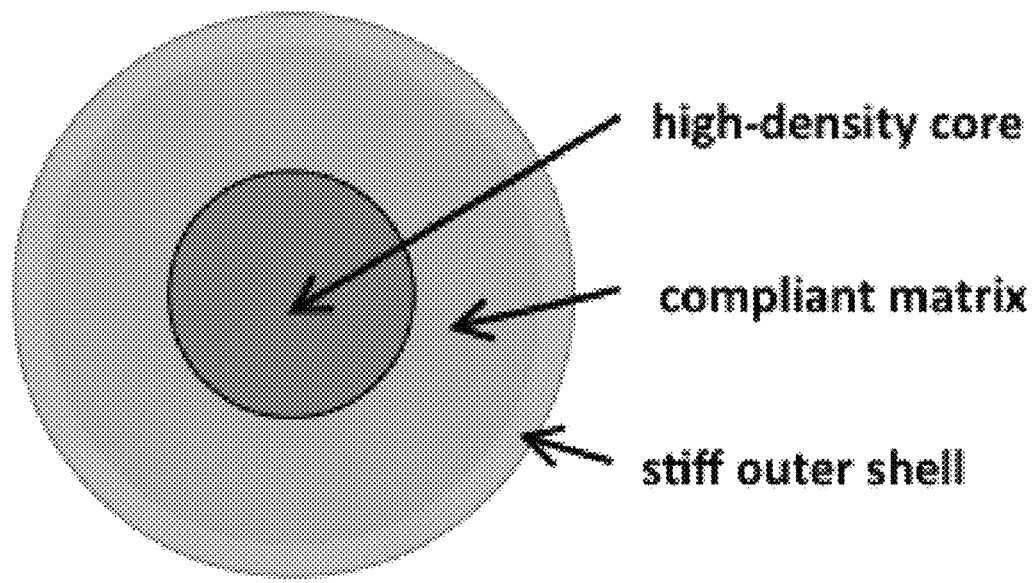
FIG. 9 shows a layered structure of acoustic proppant particles.
Figures 10, 11, 12:
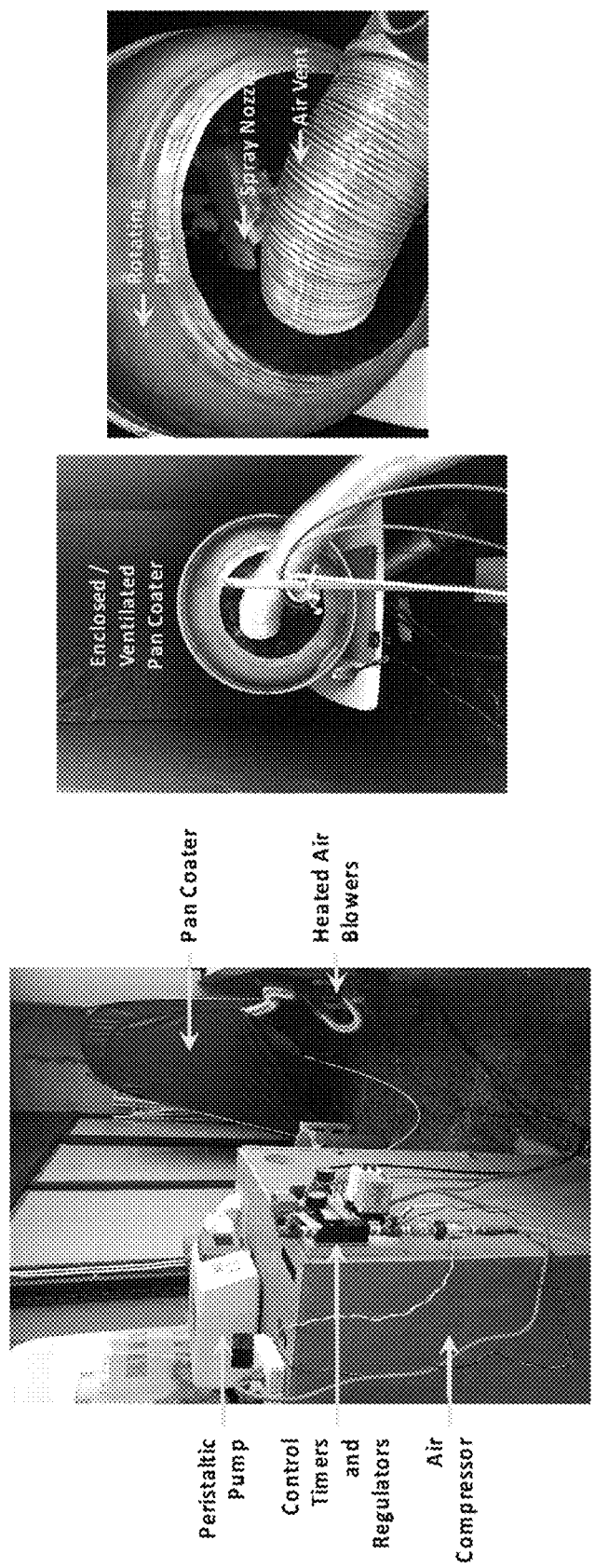

FIG. 9 shows a layered structure of acoustic proppant particles.

FIGS. 9-12 show part of the small scale pan coating fabrication system for acoustic particle production.

Figure 13:
FIG. 13 shows a fluidized bed coating system used for acoustic proppant particle production.

FIG. 13 shows a fluidized bed coating system used for acoustic proppant particle production.

Figure 14:
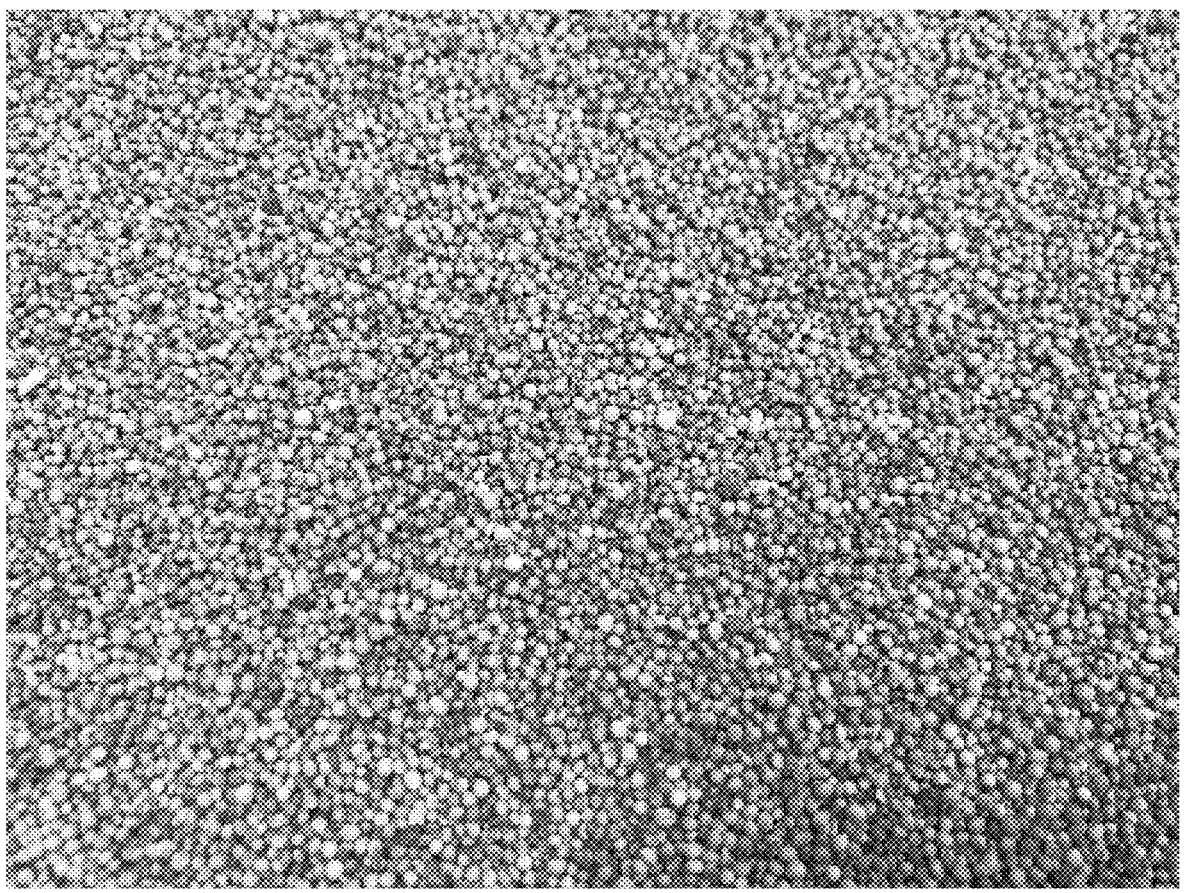
FIG. 14 shows an example batch of 12/20 mesh acoustic proppant particles.

FIG. 14 shows an example batch of 12/20 mesh acoustic proppant particles.

Figures 15, 16, 17:
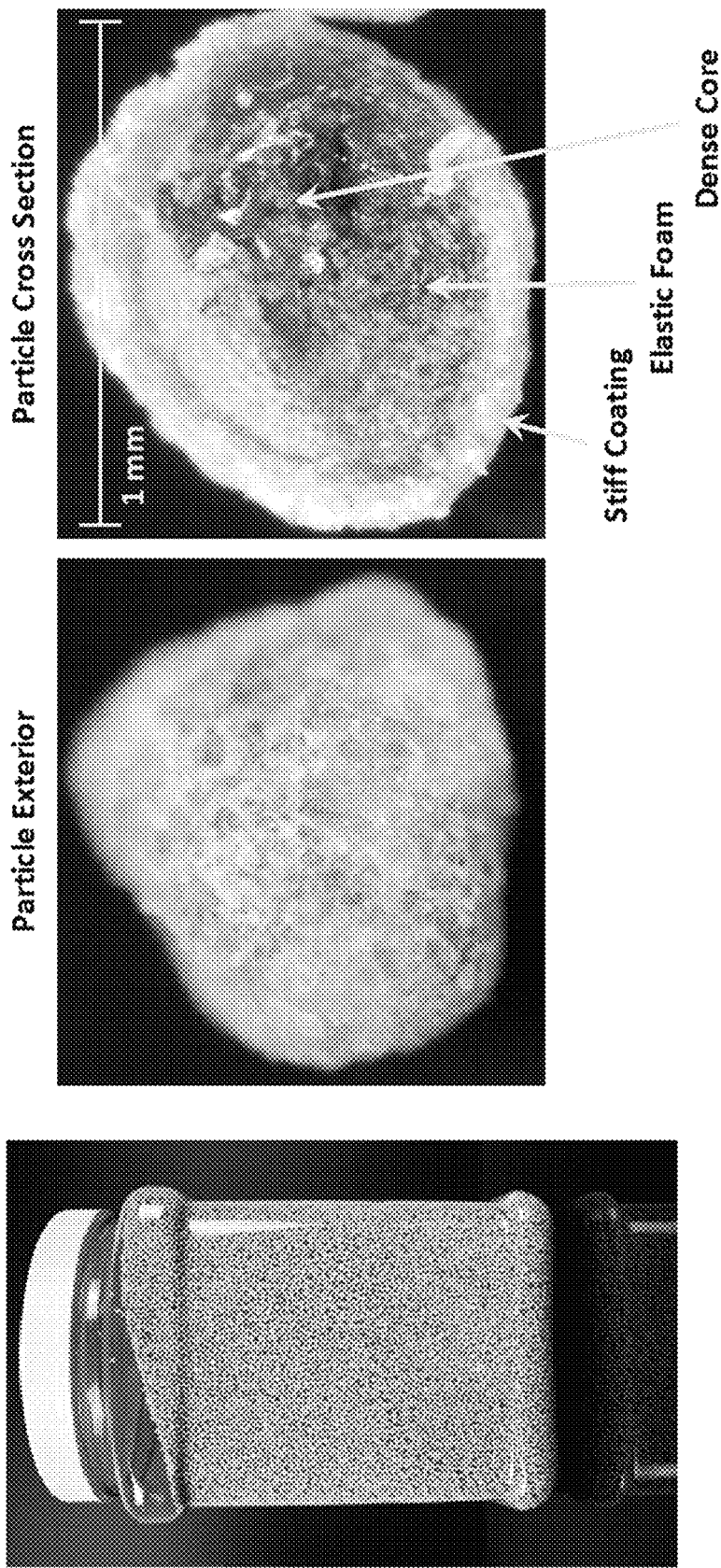
FIGS. 15-17 show an acoustic proppant batch in FIG. 15, macroscopic photographs of a particle exterior in FIG. 16 and a particle cross-section in FIG. 17.

FIGS. 15-17 show an acoustic proppant batch in FIG. 15, macroscopic photographs of a particle exterior in FIG. 16 and a particle cross-section in FIG. 17.

Figure 19:
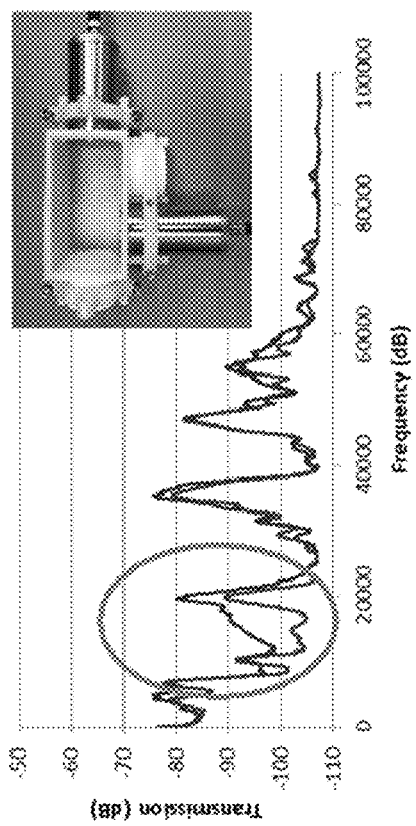
FIGS. 18 and 19 show ultrasonic transmission testing of 12/20 mesh acoustic proppant with 3D printed proppant boxes in different arrangements demonstrating acoustic band gap behavior.
Figure 18:
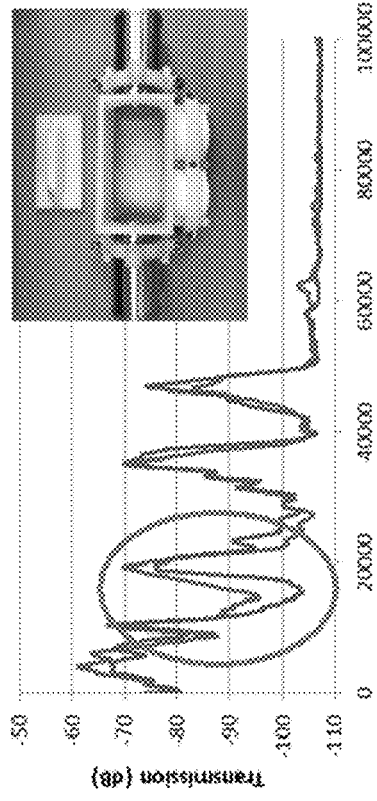

FIGS. 18 and 19 show ultrasonic transmission testing of 12/20 mesh acoustic proppant with 3D printed proppant boxes in different arrangements demonstrating acoustic band gap behavior.

Figure 21:
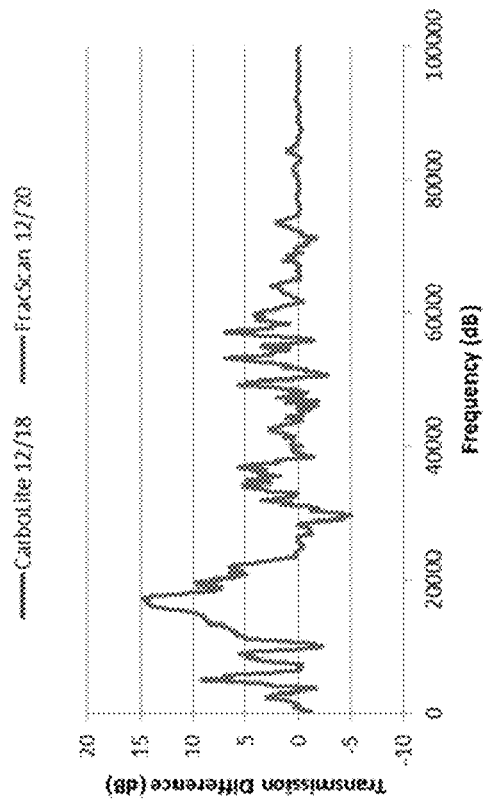
FIGS. 20 and 21 show transmission difference results.
Figure 20:
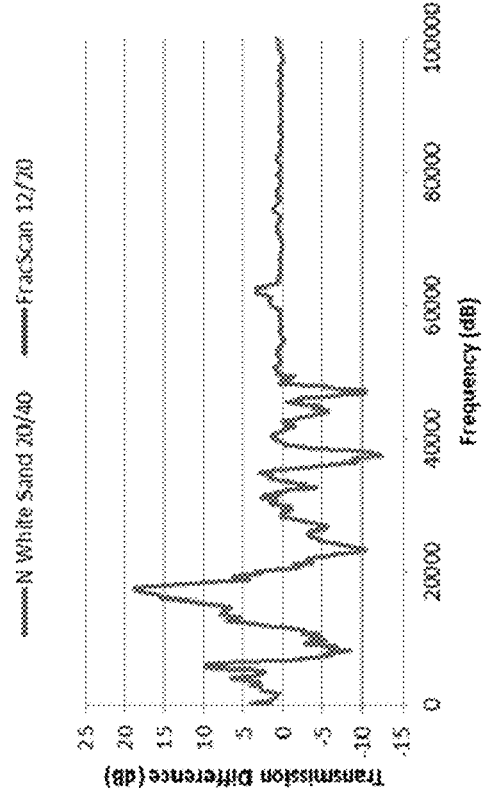

FIGS. 20 and 21 show transmission difference results.

Figures 22, 23:
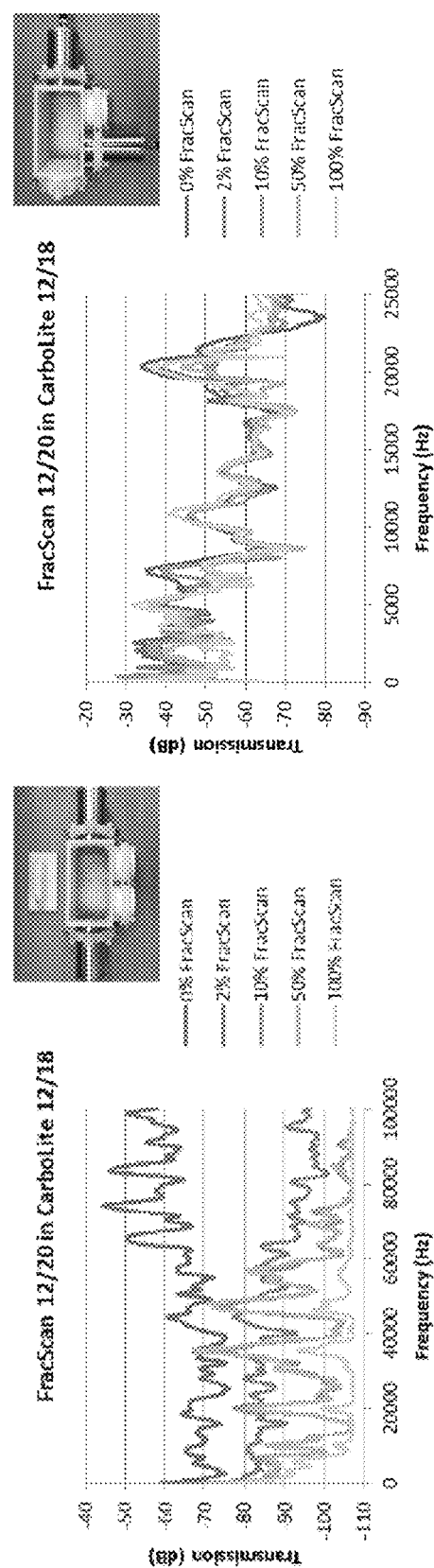
FIGS. 22-23 show ultrasonic transmission testing results with different proppant mixtures in different arrangements demonstrating concentration dependent response in overall transmission in FIG. 22 and specifically in the band gap region in FIG. 23.
Figure 24:
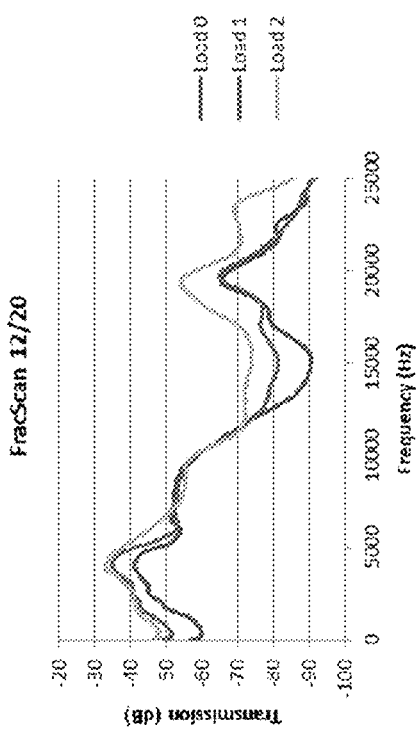
FIGS. 24-27 show ultrasonic transmission testing results of Northern White Sand 20/40 and the new acoustic proppant 12/20 under different clamped loads in a 3D printed proppant box shown in FIG. 27, demonstrating shift in the acoustic band gap to higher frequencies at increased load.
Figure 25:
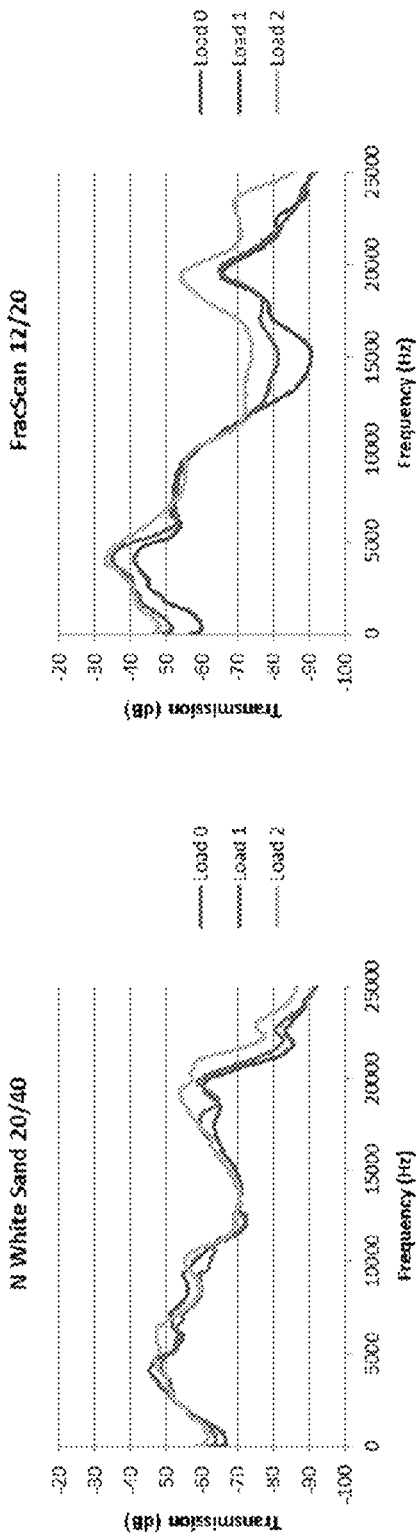

FIGS. 22-23 show ultrasonic transmission testing results with different proppant mixtures in different arrangements demonstrating concentration dependent response in overall transmission in FIG. 22 and specifically in the band gap region in FIG. 23.

Figure 27:
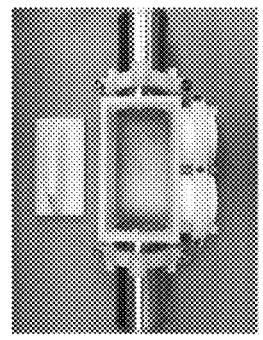
Figure 26:
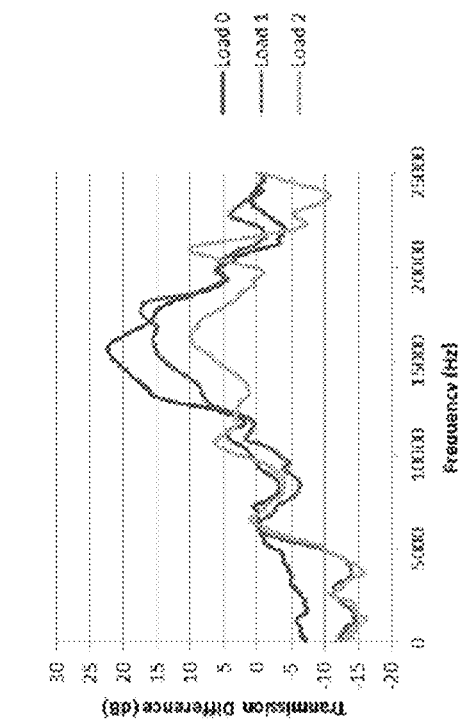

FIGS. 24-27 show ultrasonic transmission testing results of Northern White Sand 20/40 and the new acoustic proppant 12/20 under different clamped loads in a 3D printed proppant box shown in FIG. 27, demonstrating shift in the acoustic band gap to higher frequencies at increased load.

Figure 28:
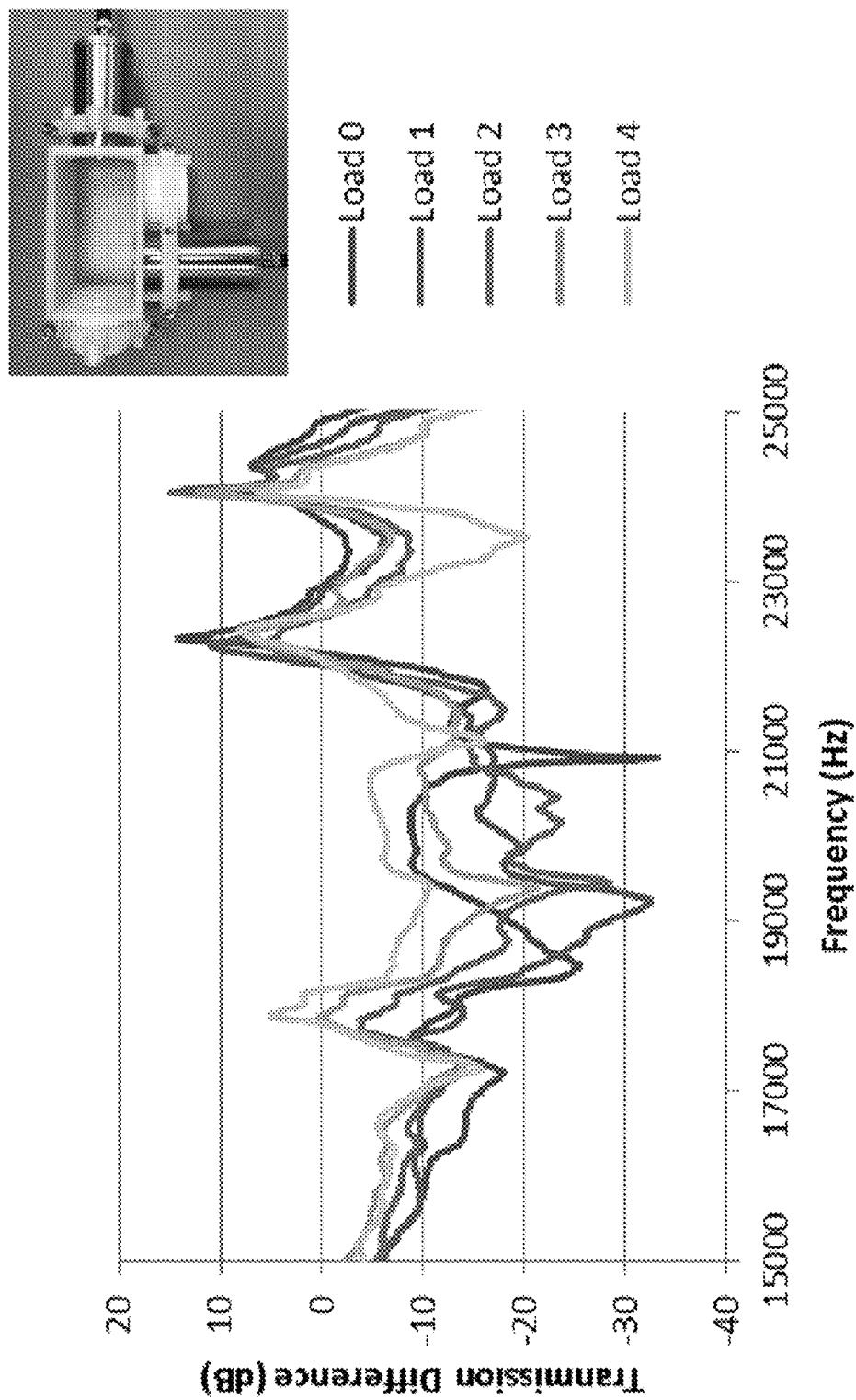
FIG. 28 shows ultrasonic transmission difference between Northern White Sand 20/40 and acoustic proppant 12/20 under different clamped loads, demonstrating shift in the acoustic band gap to higher frequencies at increased load.

FIG. 28 shows ultrasonic transmission difference between Northern White Sand 20/40 and acoustic proppant 12/20 under different clamped loads, demonstrating shift in the acoustic band gap to higher frequencies at increased load.

Figures 29, 30:
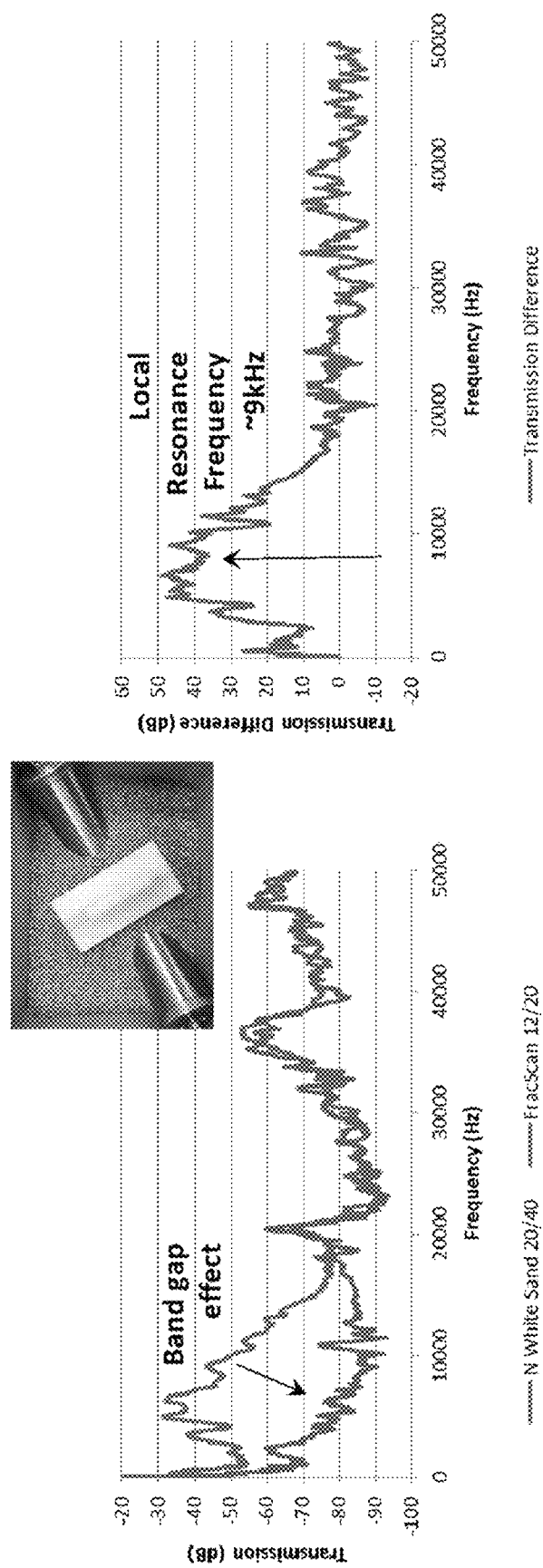
FIGS. 29 and 30 show transmission in FIG. 29 and transmission difference in FIG. 30 for Northern White Sand 20/40 in FIG. 29 and the new smart proppant 12/20.

FIGS. 29 and 30 show transmission in FIG. 29 and transmission difference in FIG. 30 for Northern White Sand 20/40 in FIG. 29 and the new smart proppant 12/20.

Figure 31:
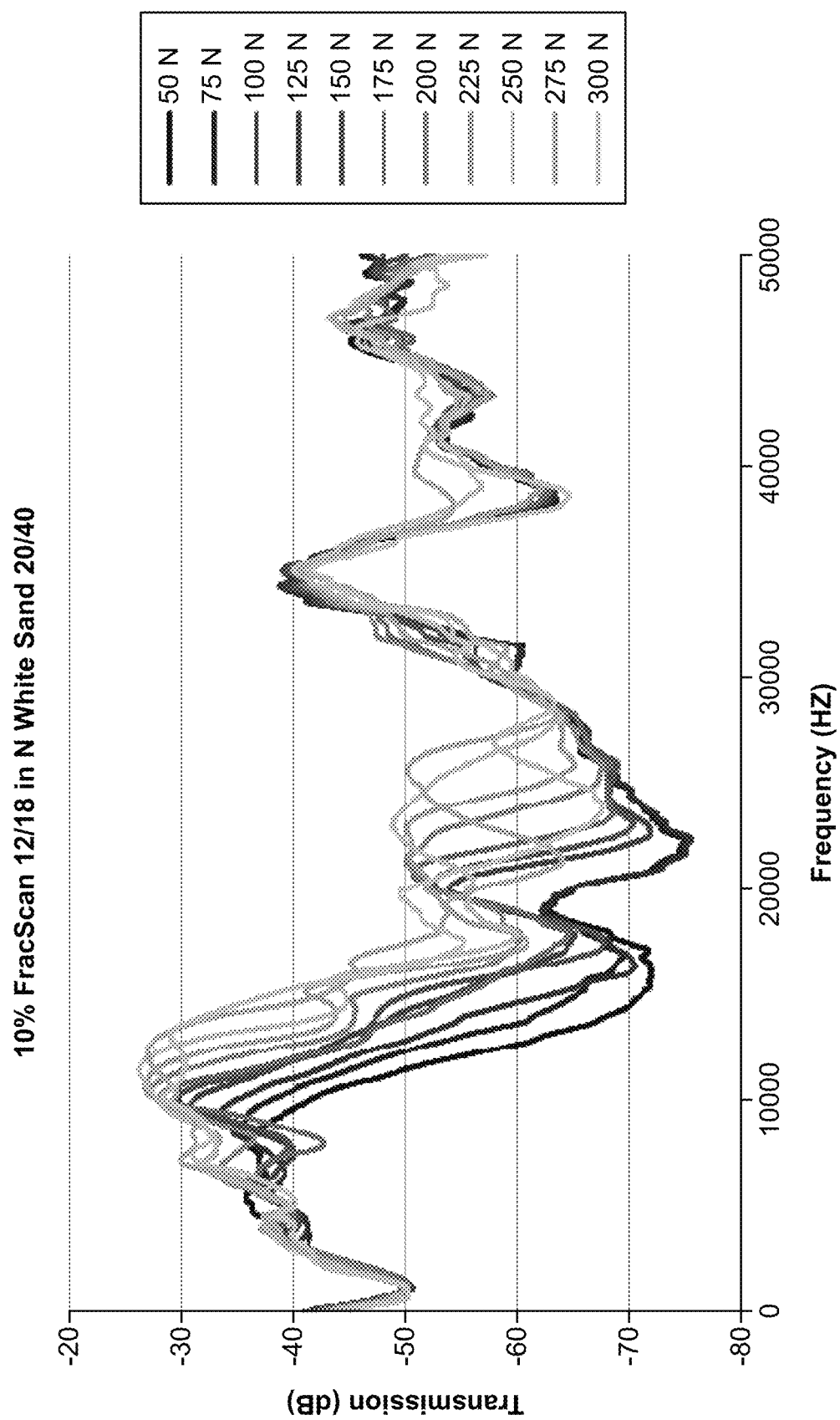
FIGS. 31-34 show results of ultrasonic testing with mechanical loading for a 10 wt % mixture of acoustic proppant 12/18 in Northern White Sand 20/40 in FIG. 31, comparison to pure Northern White Sand 20/40 in FIG. 33, demonstrating dependence of acoustic signature on mechanical load in FIG. 34.
Figure 33:
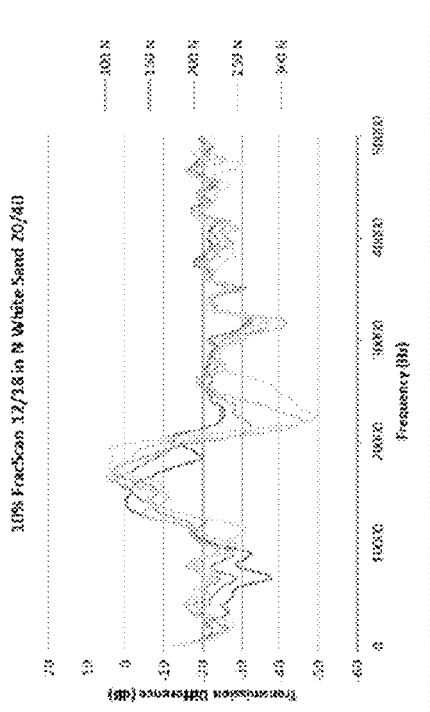
Figure 32:
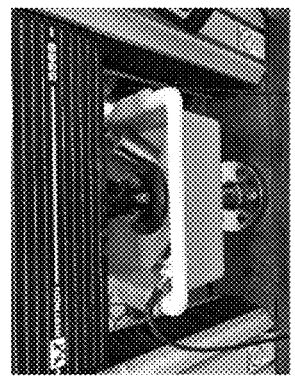
Figure 34:
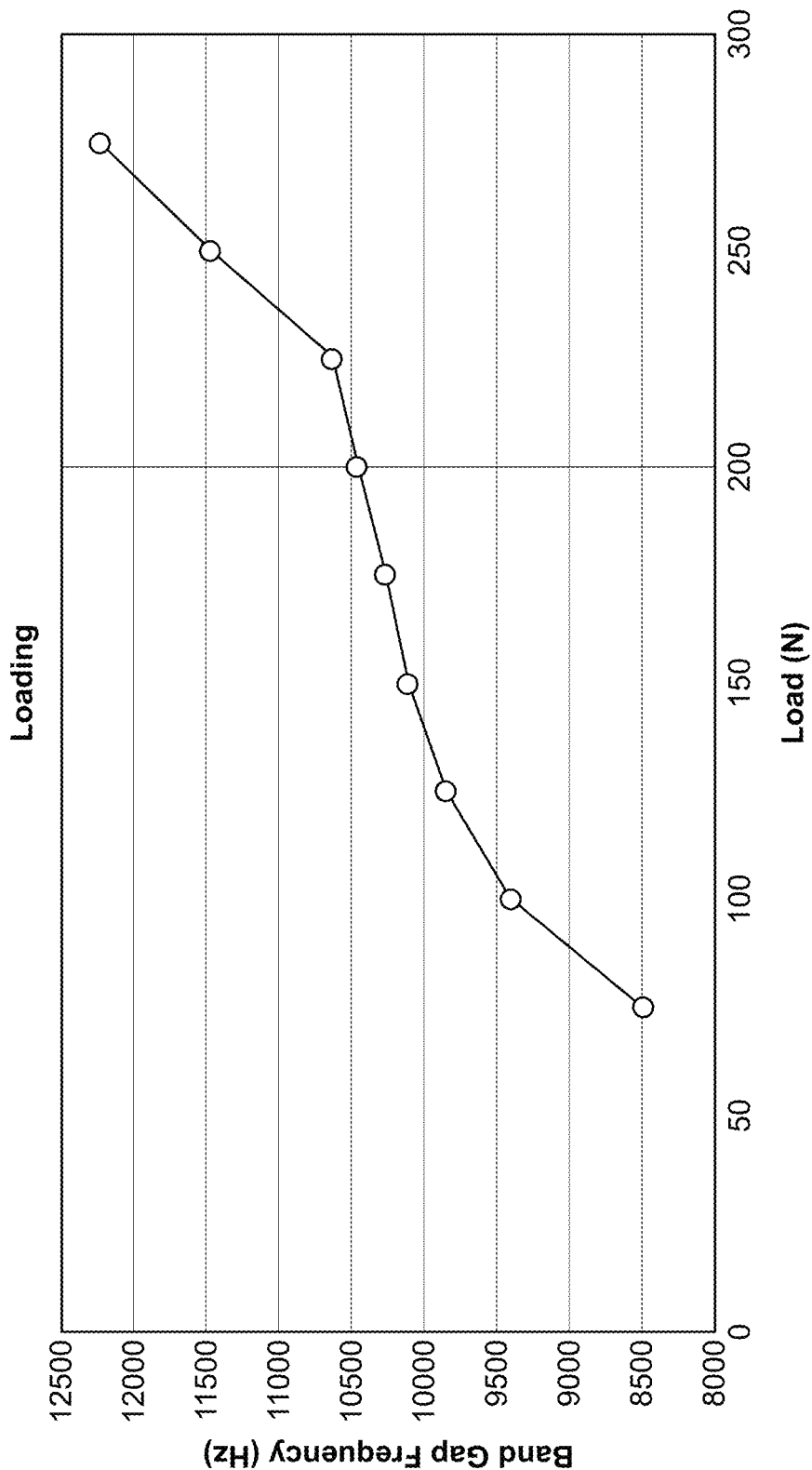
Figure 35:
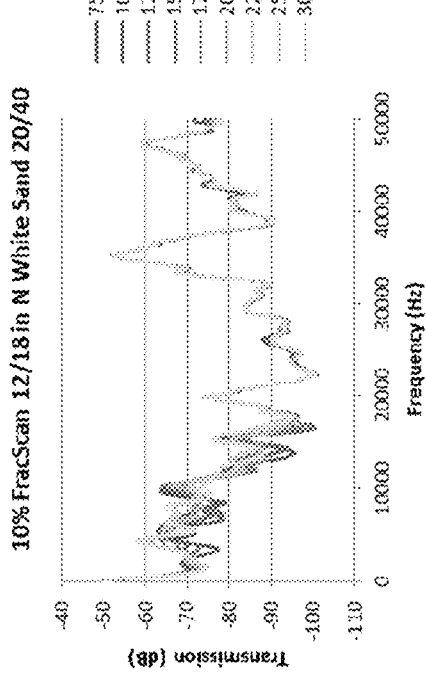
FIGS. 35-38 show results of ultrasonic testing of 10 wt % acoustic proppant 12/18 mixture with quasi-static unloading, demonstrating load dependent shift in acoustic band gap frequency.
Figure 36:
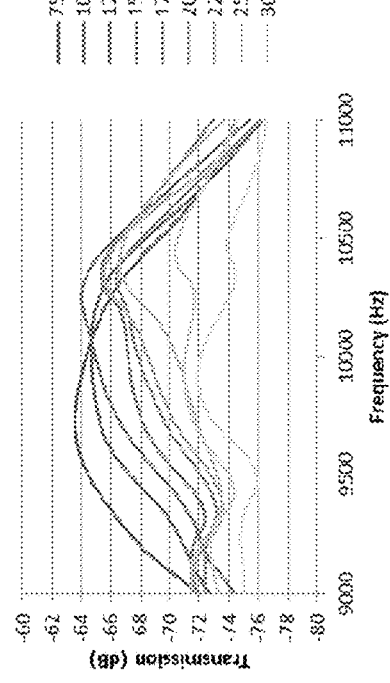
Figure 38:
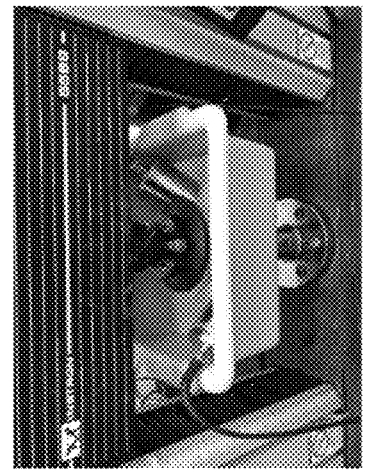
Figure 37:
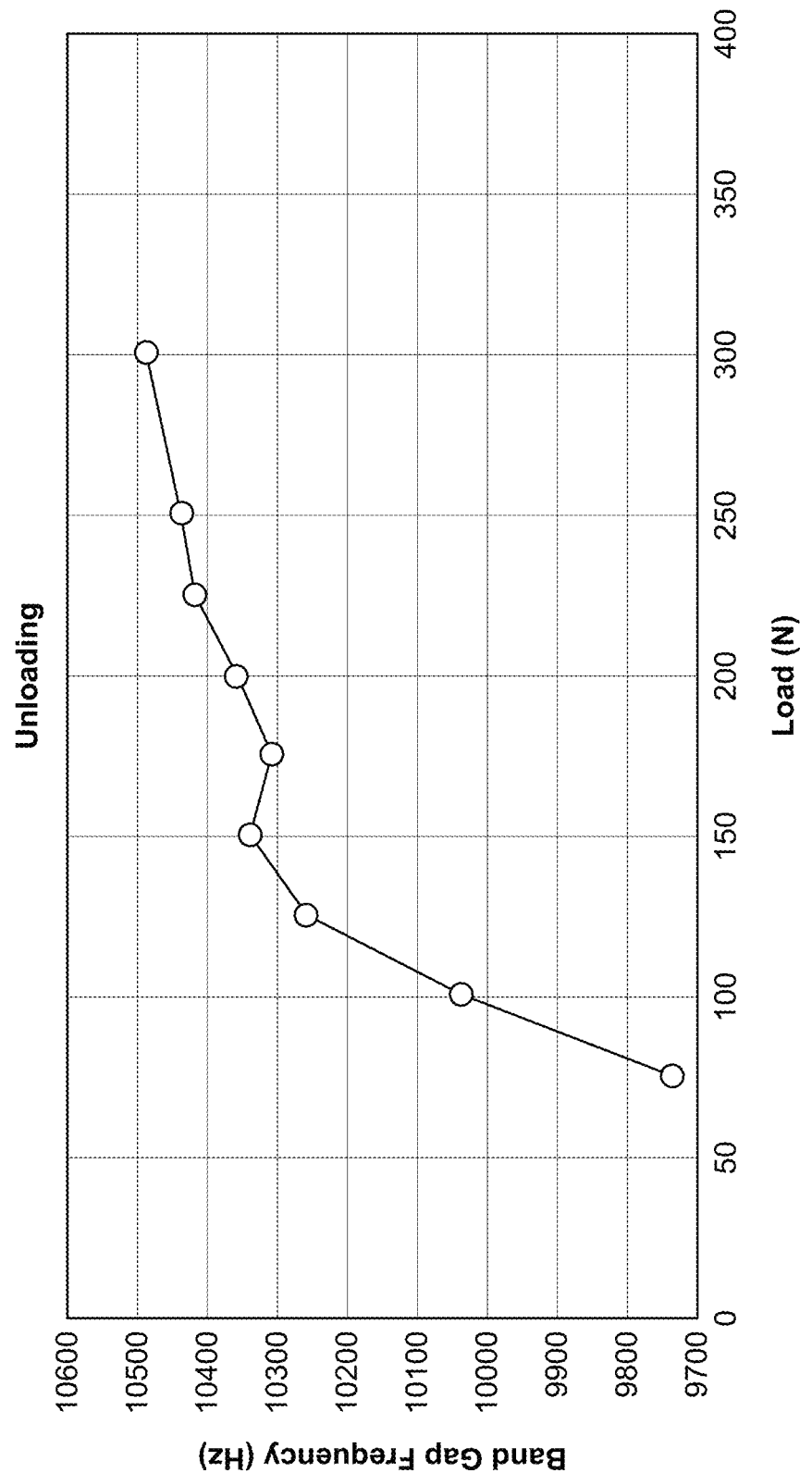

FIGS. 31-34 show results of ultrasonic testing with mechanical loading for a 10 wt % mixture of acoustic proppant 12/18 in Northern White Sand 20/40 in FIG. 31, comparison to pure Northern White Sand 20/40 in FIG. 33, demonstrating dependence of acoustic signature on mechanical load in FIG. 34.

FIGS. 35-38 show results of ultrasonic testing of 10 wt % acoustic proppant 12/18 mixture with quasi-static unloading, demonstrating load dependent shift in acoustic band gap frequency.

Figure 39:
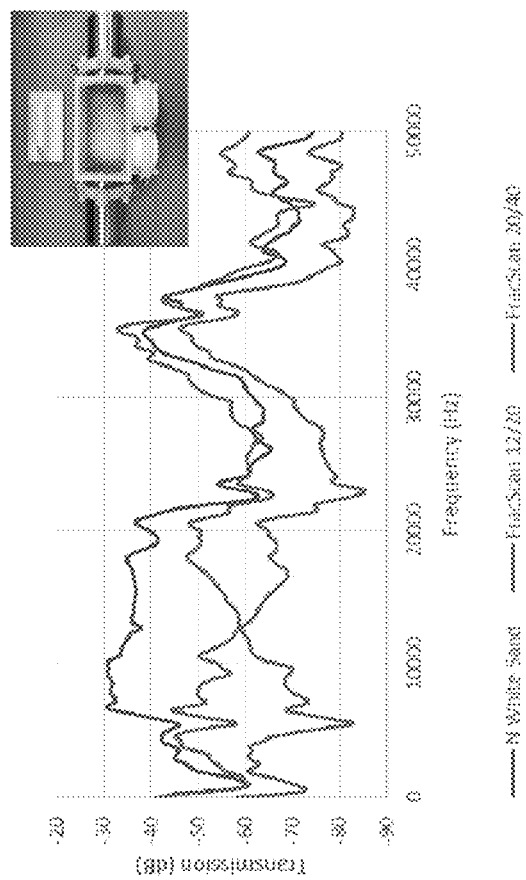
FIGS. 39 and 40 show comparison of ultrasonic transmission of Northern White Sand 20/40 with acoustic proppant 12/20 and acoustic proppant 20/40 showing a shift in band gap frequency to higher frequency with smaller particles in FIG. 39 and comparison of band gap frequencies with the tool energy of a monopole logging tool in FIG. 40.
Figure 40:
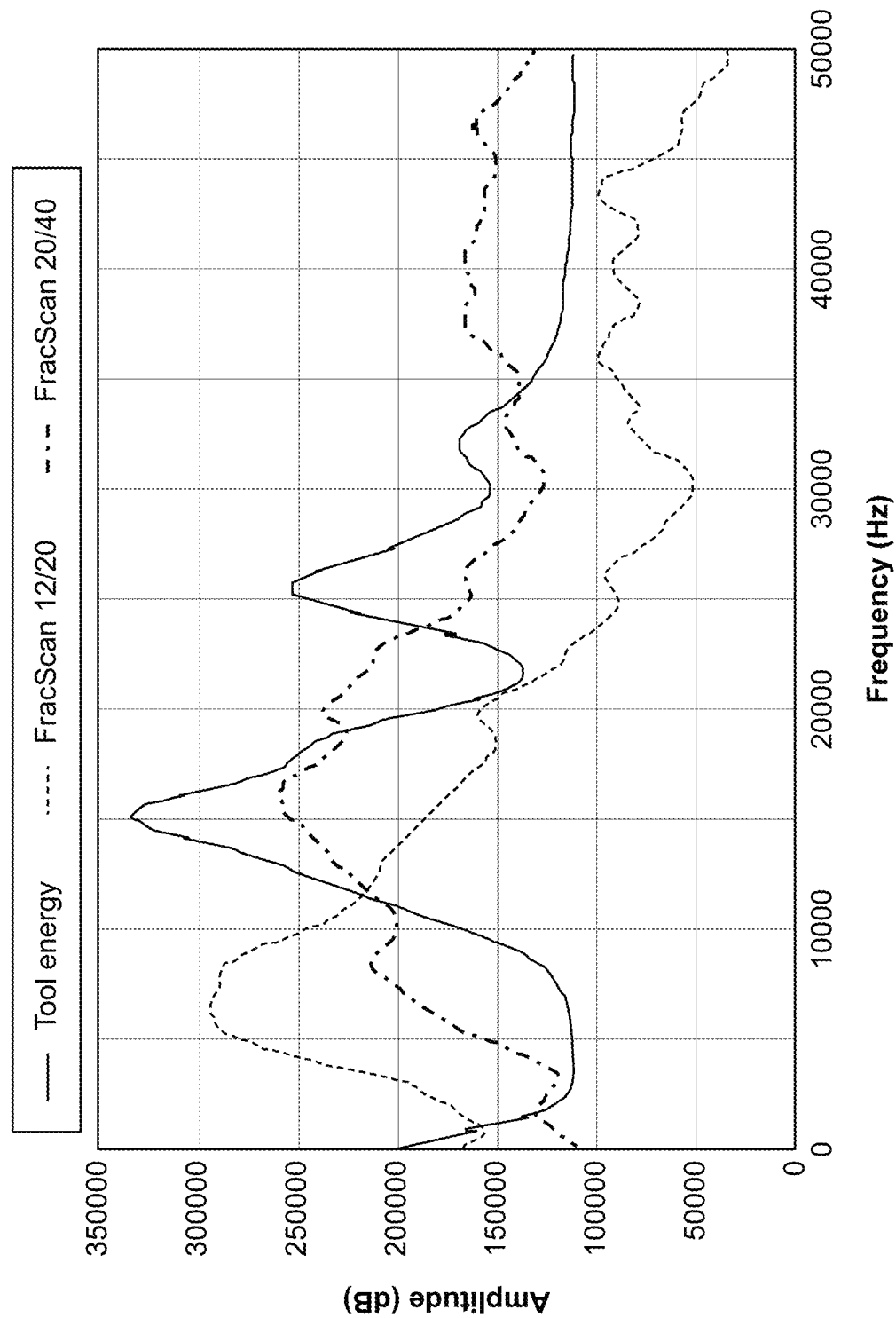

FIGS. 39 and 40 show comparison of ultrasonic transmission of Northern White Sand 20/40 with acoustic proppant 12/20 and acoustic proppant 20/40 showing a shift in band gap frequency to higher frequency with smaller particles in FIG. 39 and comparison of band gap frequencies with the tool energy of a monopole logging tool in FIG. 40.

Figures 41A, 41B:
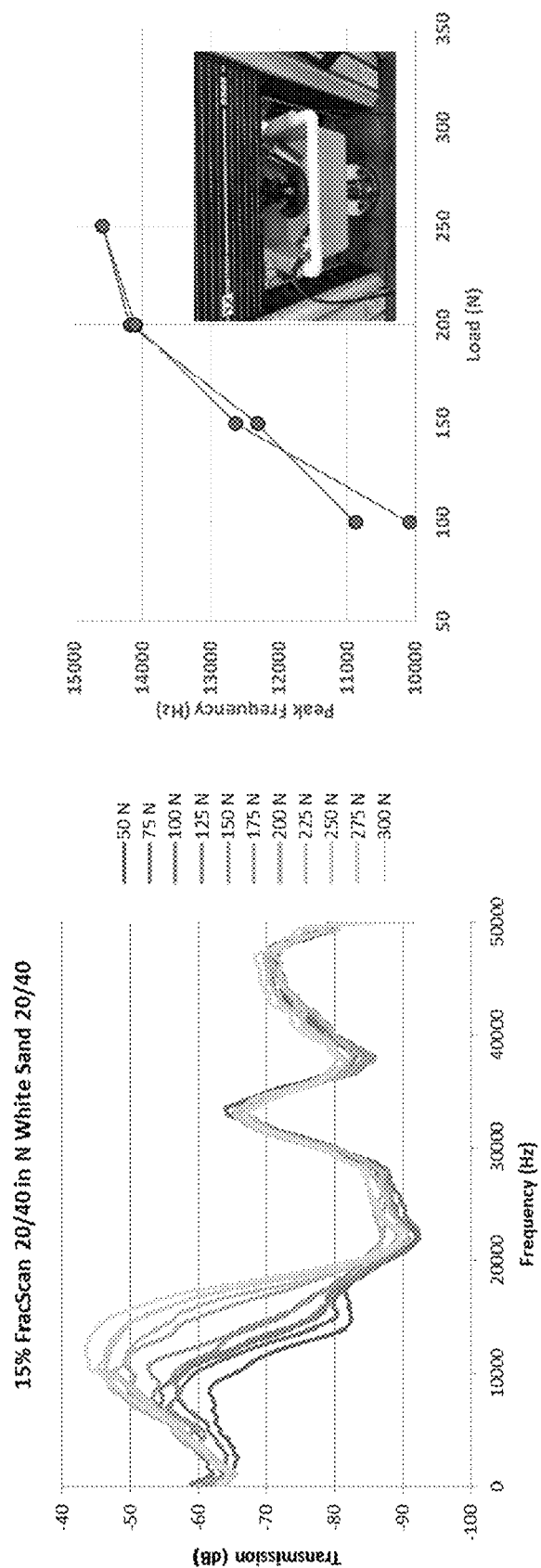
FIG. 41 shows results of ultrasonic testing of 15 wt % acoustic proppant 20/40 with mechanical loading and unloading demonstrating shift in acoustic transmission spectrum to higher frequencies around the band gap frequency.

FIG. 41 shows results of ultrasonic testing of 15 wt % acoustic proppant 20/40 with mechanical loading and unloading demonstrating shift in acoustic transmission spectrum to higher frequencies around the band gap frequency.

Figures 42A, 42B:
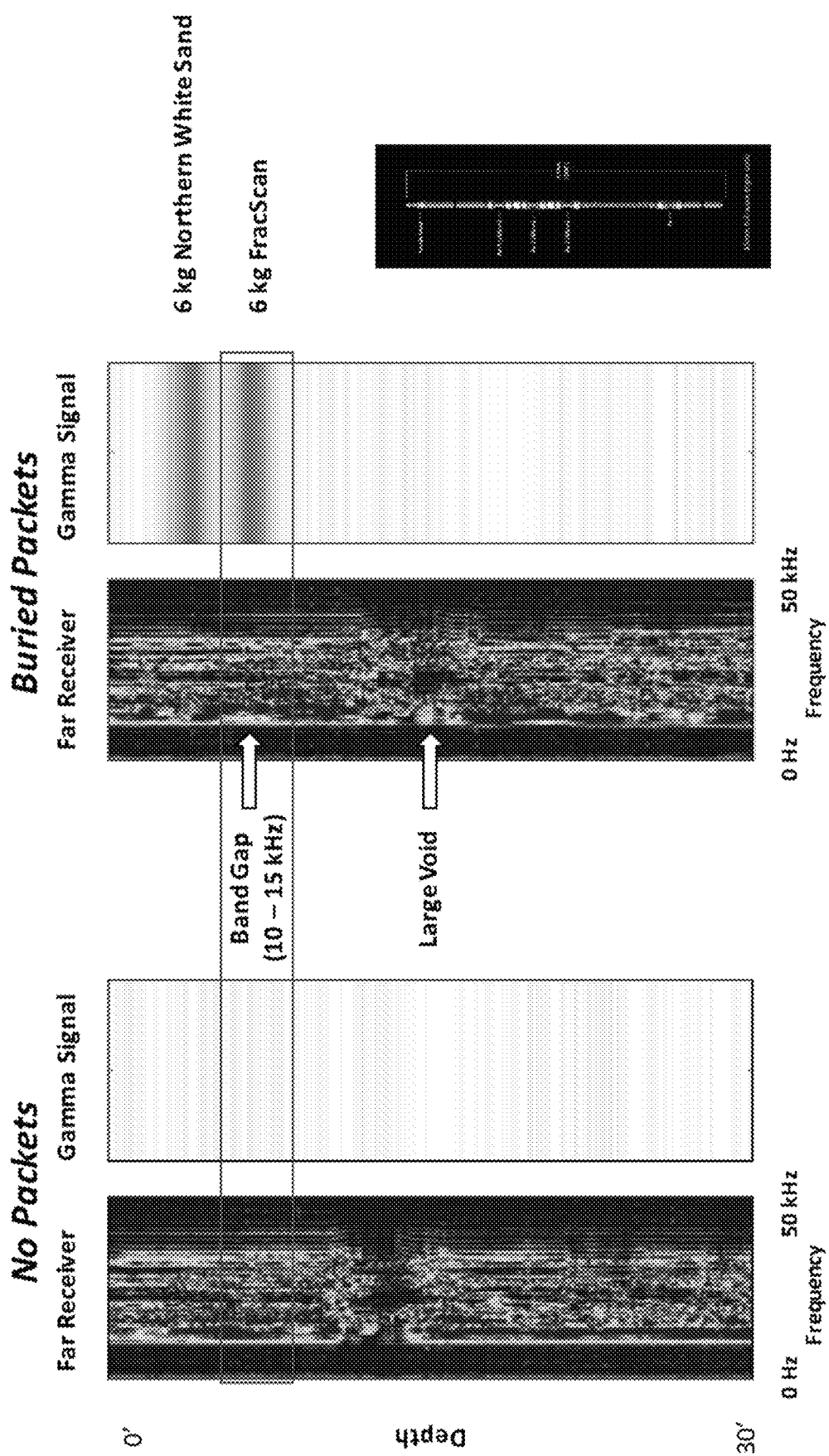
FIG. 42 shows logging results in the frequency domain with band gap indicating the new acoustic proppant 12/20 packet size and location (blue is low spectral energy and red is high).

FIG. 42 shows logging results in the frequency domain with band gap indicating the new acoustic proppant 12/20 packet size and location (blue is low spectral energy and red is high).

Figure 43:
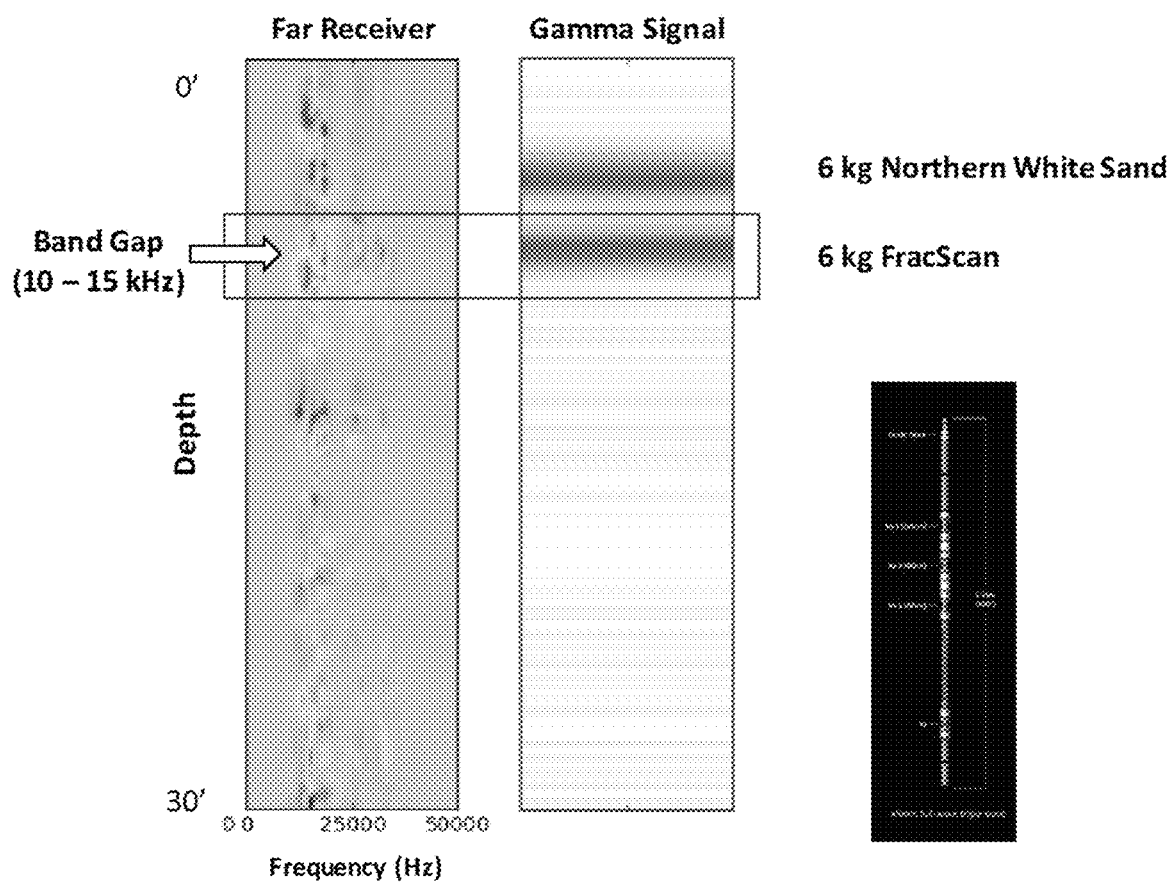
FIG. 43 shows difference plot highlighting band gap region in the frequency domain at the position of the acoustic proppant 12/20 packet (blue is negative and red is positive).

FIG. 43 shows difference plot highlighting band gap region in the frequency domain at the position of the acoustic proppant 12/20 packet (blue is negative and red is positive).

Figure 44:
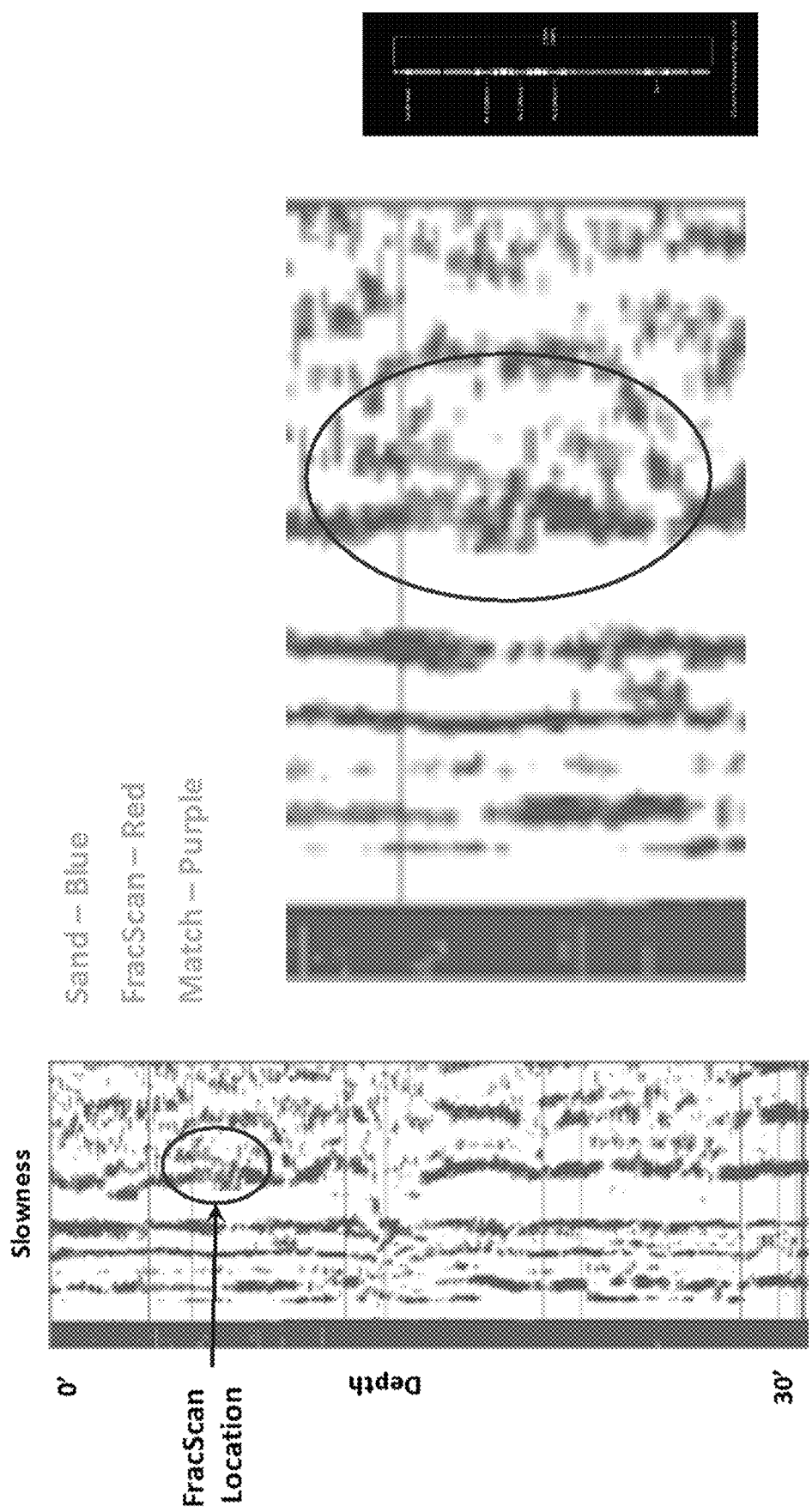
FIG. 44 shows overlaid semblance logs with shift in arrival wave slowness indicating proppant position.

FIG. 44 shows overlaid semblance logs with shift in arrival wave slowness indicating proppant position.

While the invention has been described with reference to specific embodiments, modifications and variations of the invention may be constructed without departing from the scope of the invention, which is defined in the following claims.

I claim:

1. Materials comprising:
   deployable acoustic proppants for use in acoustic well logging and remote monitoring,
   wherein each of the acoustic proppants comprises:
   a high density core,
   a compliant matrix surrounding the core, and
   a stiff outer shell surrounding the compliant matrix,
   wherein groups of the acoustic proppants are produced from selected acoustic metamaterials having different resonances and different transmission losses at different applied frequencies.

2. A method comprising:
   providing plural different groups of distinct band gap shifting acoustic resonance proppants having dense cores, compliant matrixes surrounding the dense cores and stiff outer shells surrounding the compliant matrixes,
   sequentially introducing the different groups of the acoustic resonance proppants having similar structures and similar resonances to the well fracturing hydraulic fluids, circulating through the well the hydraulic fluids with the sequentially introduced different groups of the acoustic resonance proppants,
   migrating and depositing the different groups of the acoustic resonance proppants in fractures extending from the well,
   sensing return from the well by sensing the resonance of the acoustic proppants and distinguishing the different groups by distinct resonance of the acoustic proppants.

3. The method of claim 2, further comprising:
   providing a plural sonic monopole tool having plural sonic sources and plural sonic receivers,
   lowering on a wire in the well the plural sonic monopole logging tool, and
   locating position of concentrations of the different groups by distinct resonances of the sonic sources with the plural sonic monopole logging tool.

4. The method of claim 2, further comprising:
   sensing load stress on the different groups by sensing acoustic band shifts in different resonances in the different groups.

* * * * *